(12) United States Patent
Peng

(10) Patent No.: US 7,319,499 B2
(45) Date of Patent: Jan. 15, 2008

(54) COMPOSITE STRUCTURE OF ALUMINUM EXTRUSION EXTERNAL FRAMEWORK OF LCD MONITOR

(76) Inventor: Ching-Lung Peng, 1460, Chung Cheng West Road, Chu Pei City, Hsinchu Hsien (TW)

( * ) Notice: Subject to any disclaimer, the term of this patent is extended or adjusted under 35 U.S.C. 154(b) by 383 days.

(21) Appl. No.: 11/143,607

(22) Filed: Jun. 3, 2005

(65) Prior Publication Data

US 2006/0279669 A1   Dec. 14, 2006

(51) Int. Cl.
*G02F 1/1333* (2006.01)
*G06F 1/16* (2006.01)

(52) U.S. Cl. .............................. 349/58; 349/56; 349/59; 361/681; 362/632; 362/633; 362/634

(58) Field of Classification Search .................. 349/56, 349/58–60; 361/681; 362/632–634; 40/603, 40/785; 345/87
See application file for complete search history.

(56) References Cited

U.S. PATENT DOCUMENTS

| | | | |
|---|---|---|---|
| 6,466,283 B1 * | 10/2002 | Peng | 349/58 |
| 6,809,713 B2 * | 10/2004 | Peng | 345/87 |
| 6,891,581 B2 * | 5/2005 | Peng | 349/58 |
| 6,898,886 B1 * | 5/2005 | Montecalvo | 40/740 |
| 2003/0160908 A1 * | 8/2003 | Peng | 349/58 |

* cited by examiner

*Primary Examiner*—Terrell L. McKinnon
*Assistant Examiner*—Jessica M Merlin
(74) *Attorney, Agent, or Firm*—Troxell Law Office, PLLC

(57) ABSTRACT

An aluminum extrusion external framework of LCD monitor primarily comprises a front frame cap, a back frame cap, and a sheathing, which are assembled with one another. Several movable laminas are mounted on the inside of the back frame cap, wherein the locking positions of the movable laminas are adjustable. The aluminum extrusion external framework of the LCD monitor is made of aluminum for lightening its weight and conforming to the recycle-based environmental protection so as to facilitate the heat sinking, reduce the production cost, and increase the product lifetime. Besides, the movable laminas are applied to the raised slideways around the inside of the back frame cap so as to be universally suitable for the existing LCD panel having various specifications and dimensions.

5 Claims, 17 Drawing Sheets

COMPOSITE STRUCTURE OF ALUMINUM EXTRUSION EXTERNAL FRAMEWORK OF LCD MONITOR

FIELD OF THE INVENTION

The present invention relates to an external framework for use in a thin film transistor liquid crystal display (TFT-LCD) monitor.

BACKGROUND OF THE INVENTION

The existing external framework for use in the LCD monitors is made of resin by injection-molding method directly. The recycling process of the injection-molded rein creates toxic chemical materials. Moreover, it cannot be decomposed effectively after being buried directly. It causes a lots of environmental protection issues. Moreover, for this external framework of TFT-LCD monitor, which is made of resin, a metal partition is usually applied to isolate the electromagnetic wave for reducing the radiation. However, this metal partition is composed of iron, and the resin external framework also increases the integral weight. Besides, the large-sized (over 32 inches) LCD monitor easily suffers from the problem of heat sinking.

The existing aluminum external framework for use in the TFT-LCD monitor is formed generally by casting method or aluminum extrusion method. Because the casting method results in high mold cost and the vertical ribs influence the drawing of pattern, the casting method cannot form the ribs that vertically isolate the electromagnetic wave by a single molding process. Consequently, only the aluminum extrusion method with lower mold cost conforms to economic benefit of manufacture.

Moreover, the LCD panel is securely locked by nails, which are mounted on the inside of the existing external framework. Since the locking positions of different LCD panels, which are manufactured by various manufacturers, are not standardized, various complicated processes must be introduced to the assembling operation. Therefore, a specific external framework is only suitable for the corresponding LCD panel. Consequently, the purpose of universal use is not achieved.

SUMMARY OF THE INVENTION

The main object of the present invention is to provide an aluminum extrusion external framework of a LCD monitor, wherein the front frame cap comprises: two long rims and two short rims connected with one another; a right-angled plate securely inserted into each vertical trench; and a plane plate securely inserted into each parallel trench such that the front frame cap is provided with flatness and right-angled form.

Another object of the present invention is to provide an aluminum extrusion external framework of a LCD monitor, in which several movable laminas with adjustable locking positions are mounted on the inside of the back frame cap to be universally suitable for the existing LCD panels having various specifications and dimensions for facilitating marketing and promoting competitiveness.

The still another object of the present invention is to provide an aluminum extrusion external framework of a LCD monitor, in which a trench and a plurality of movable plates are mounted inside the backside of the back frame cap. Two screw holes are formed on the movable plate, wherein one screw hole is applied to fix the PCB, and the other screw hole is applied to fix the movable plate.

DETAILED DESCRIPTION OF THE PREFERRED EMBODIMENT

Figure 1:
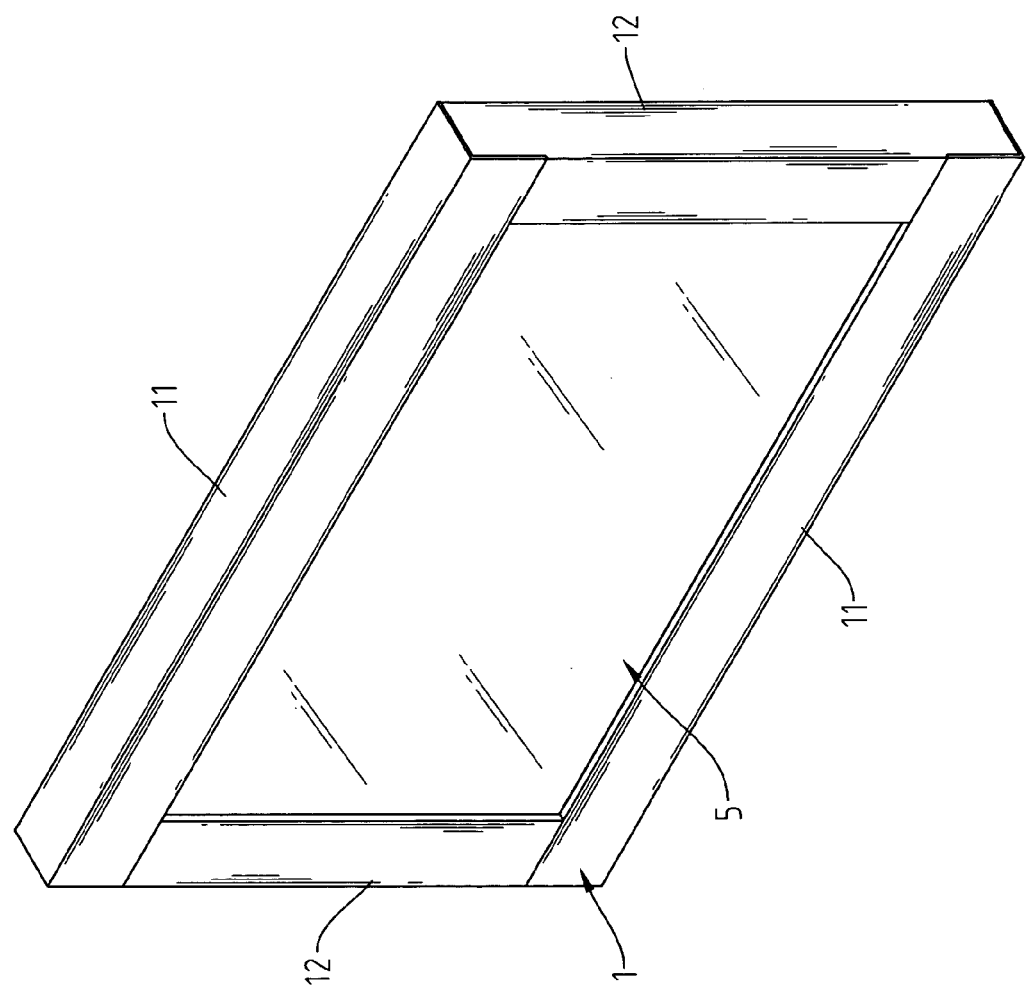
FIG. 1 is a schematic view showing the structure of the present invention.
Figure 2:
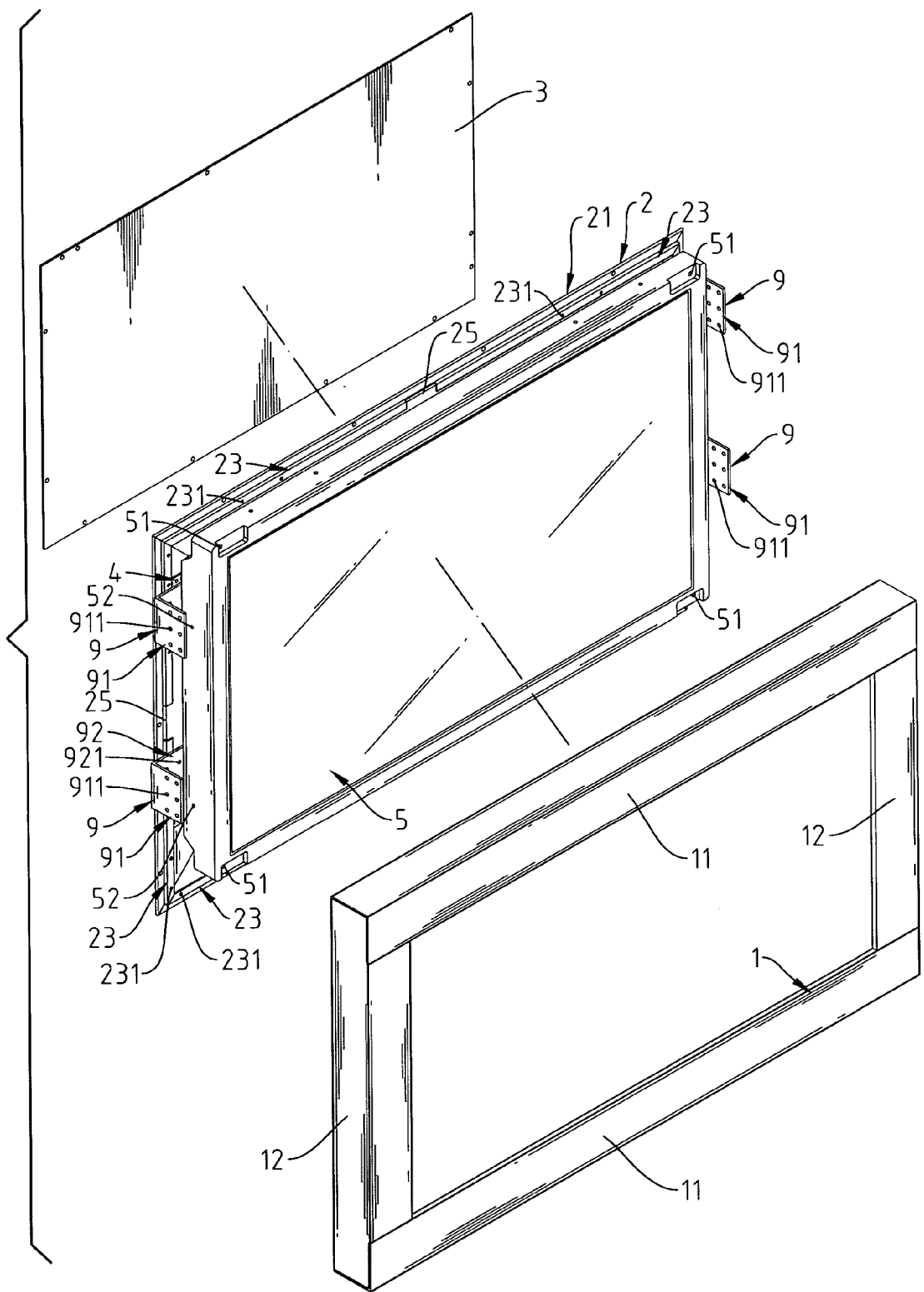
FIG. 2 is a schematic, exploded view showing the structure of the present invention.
Figure 9:
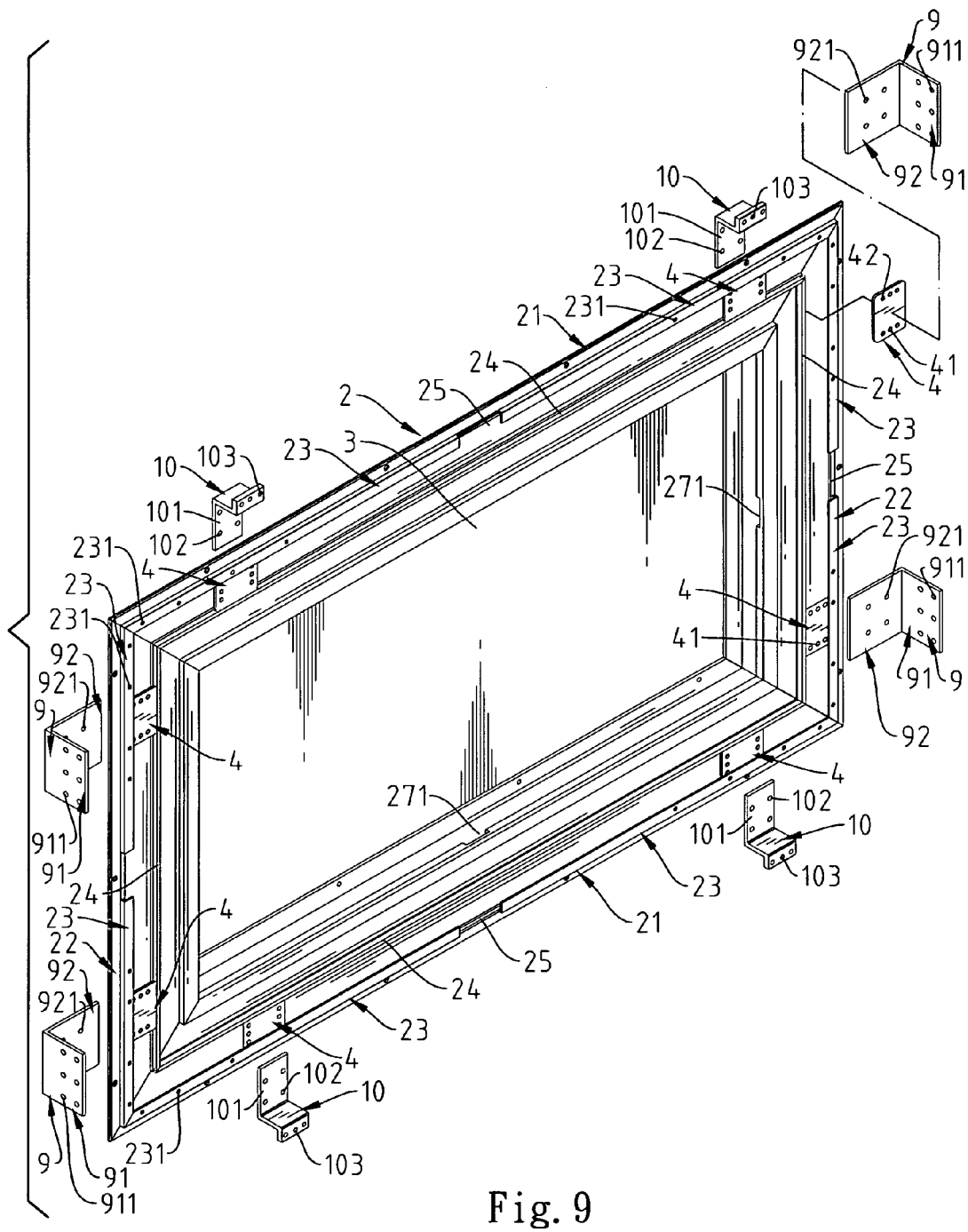
FIG. 9 is a schematic view showing that the LCD panel is assembled to the back frame cap in accordance with the present invention.

Referring to FIG. 1, FIG. 2, and FIG. 9, an aluminum extrusion external framework for use in a LCD monitor of the present invention comprises an aluminum extrusion front frame cap 1, an aluminum extrusion back frame cap 2, and an aluminum extrusion sheathing 3, which are assembled with one another. Several movable laminas 4 are mounted on the inside of the back frame cap 2, wherein the locking positions of the movable laminas 4 are adjustable. The aluminum extrusion external framework further comprises several side frames 9 and several front frames 10, which can be securely connected to the movable laminas 4.

Figure 3:
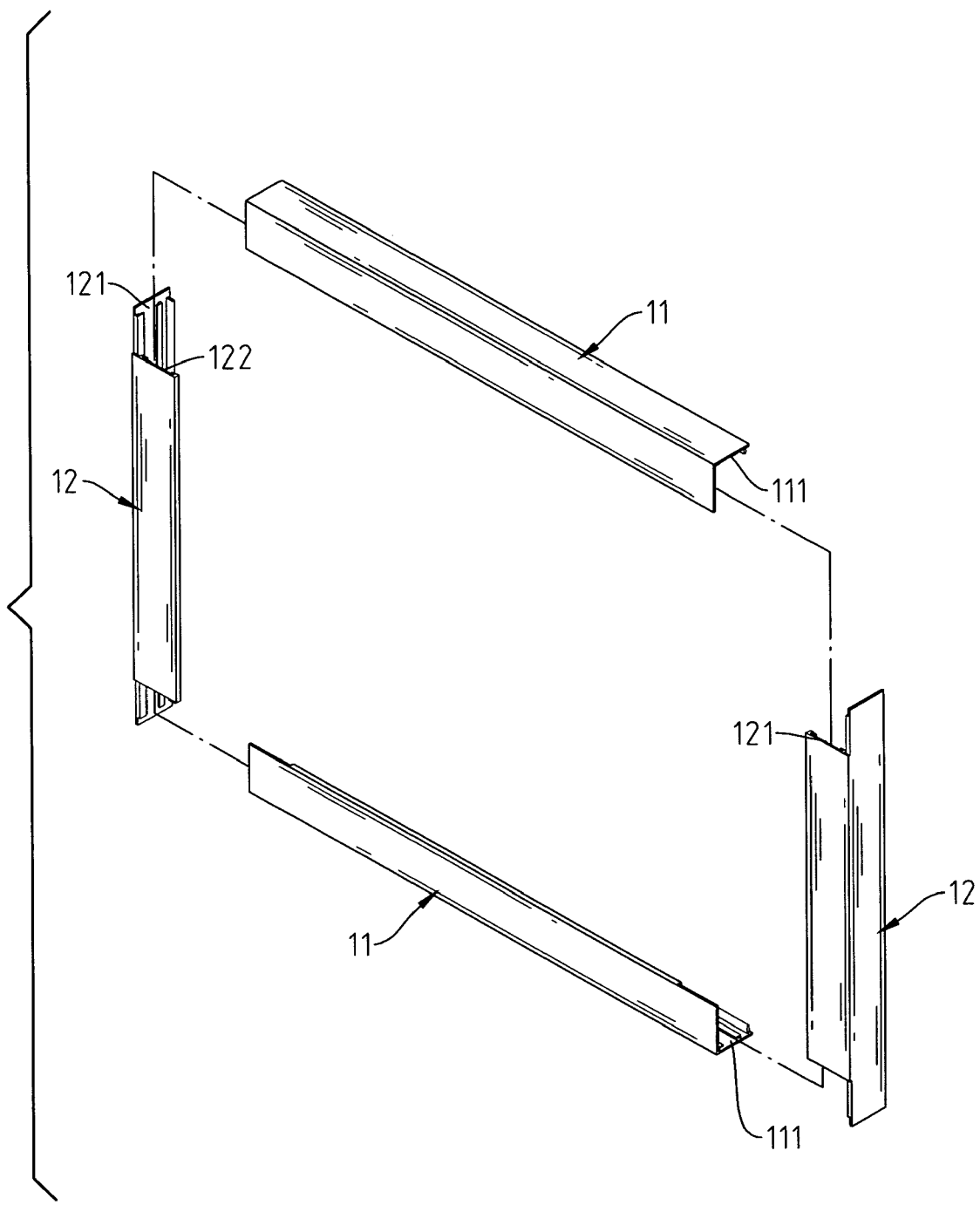
FIG. 3 is a schematic, exploded view showing the components of the front frame cap of the present invention.
Figure 4:
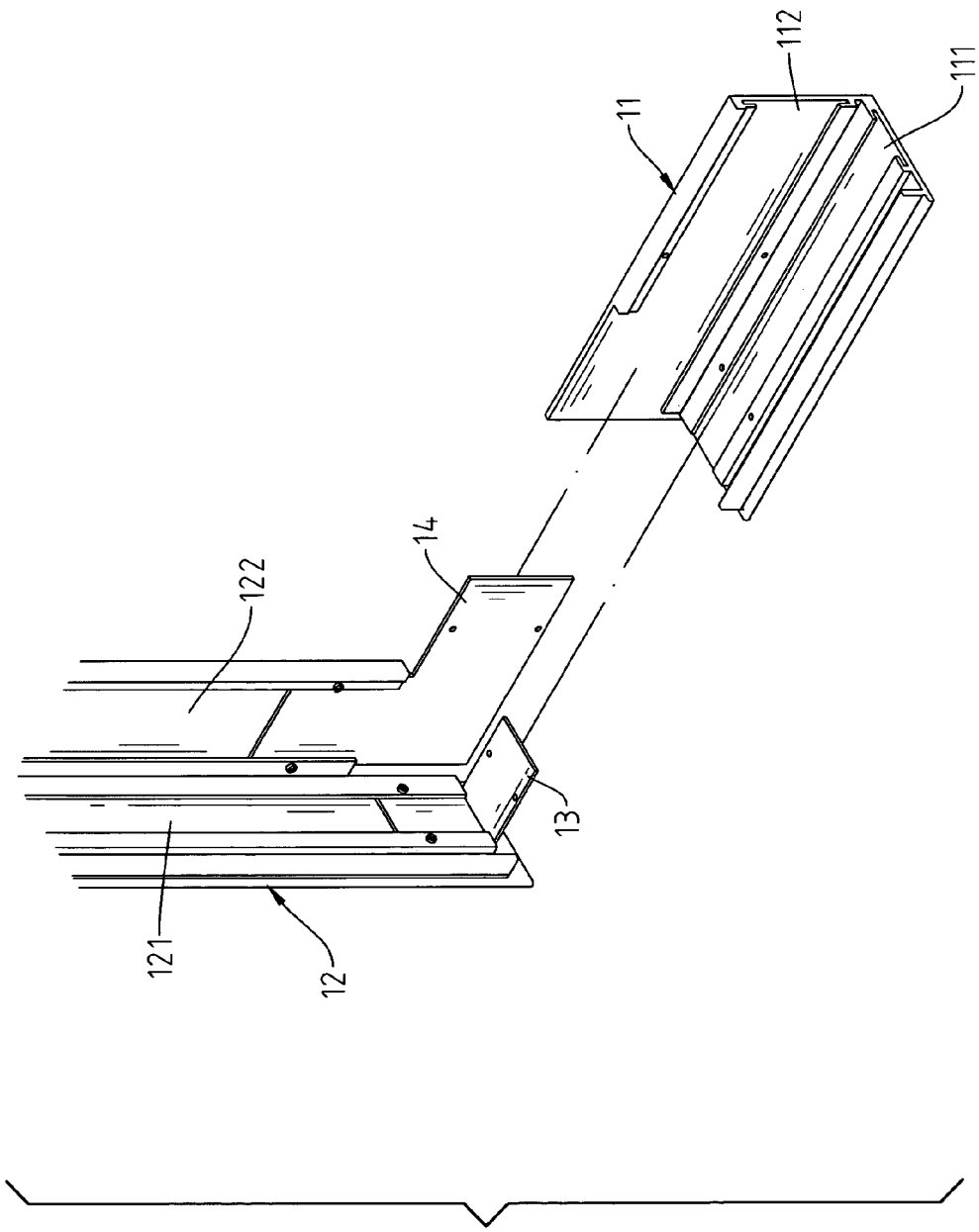
FIG. 4 is a first schematic view showing the assembling relationship between the right-angled plate and the plane plate of the front frame cap of the present invention.
Figure 5:
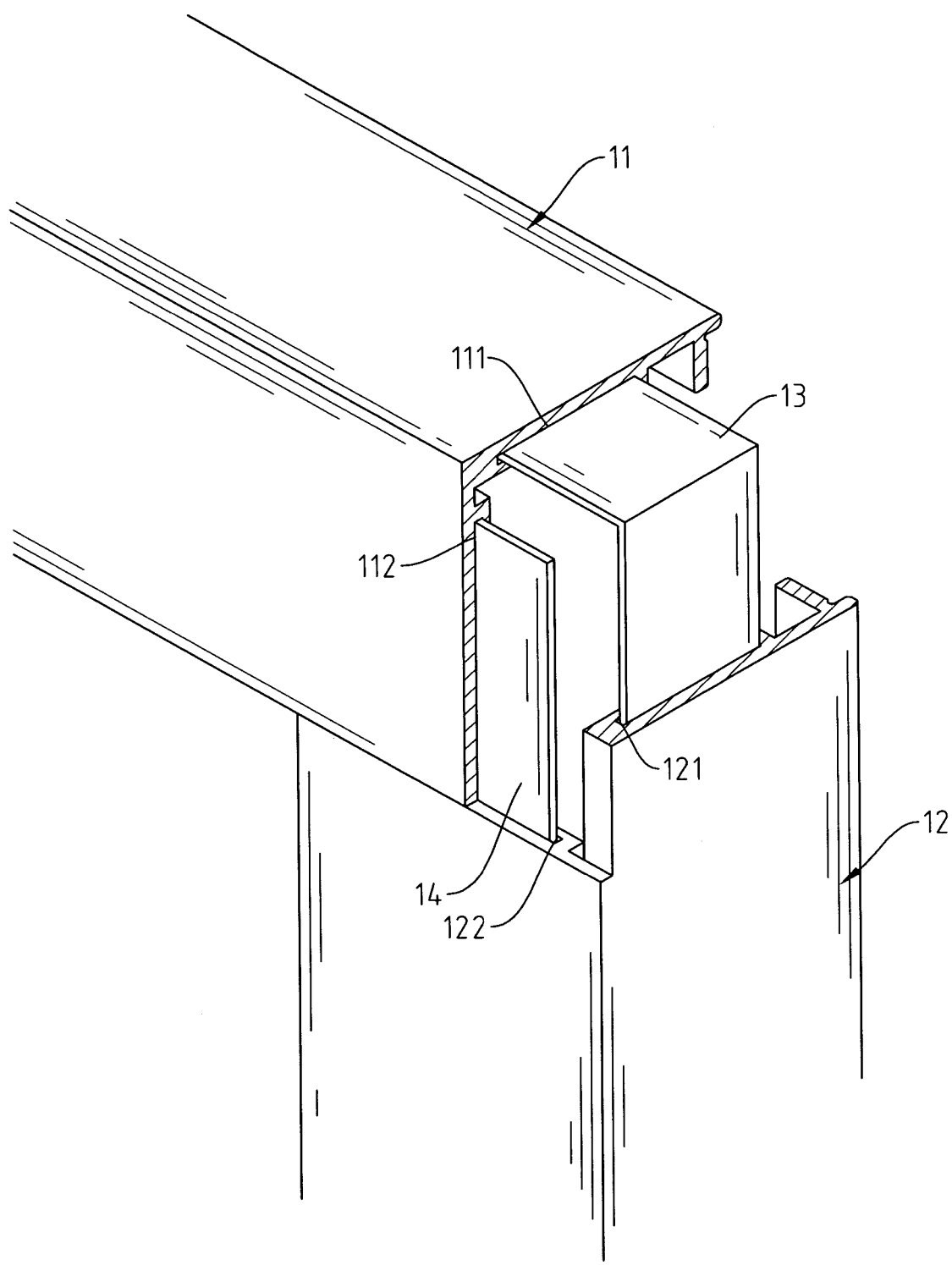
FIG. 5 is a second schematic view showing the assembling relationship between the right-angled plate and the plane plate of the front frame cap of the present invention.
Figure 6:
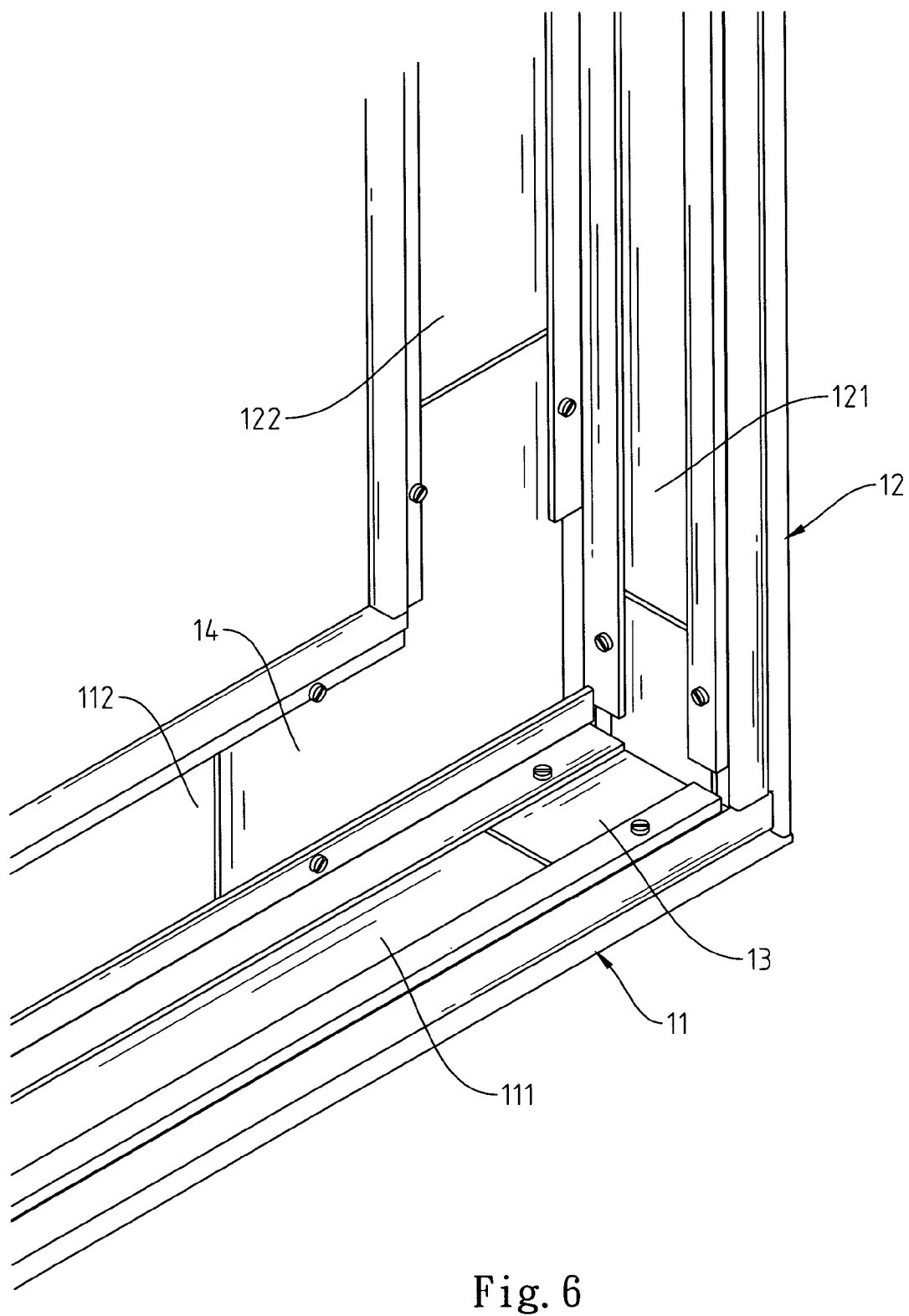
FIG. 6 is a third schematic view showing the assembling relationship between the right-angled plate and the plane plate of the front frame cap of the present invention.
Figure 7:
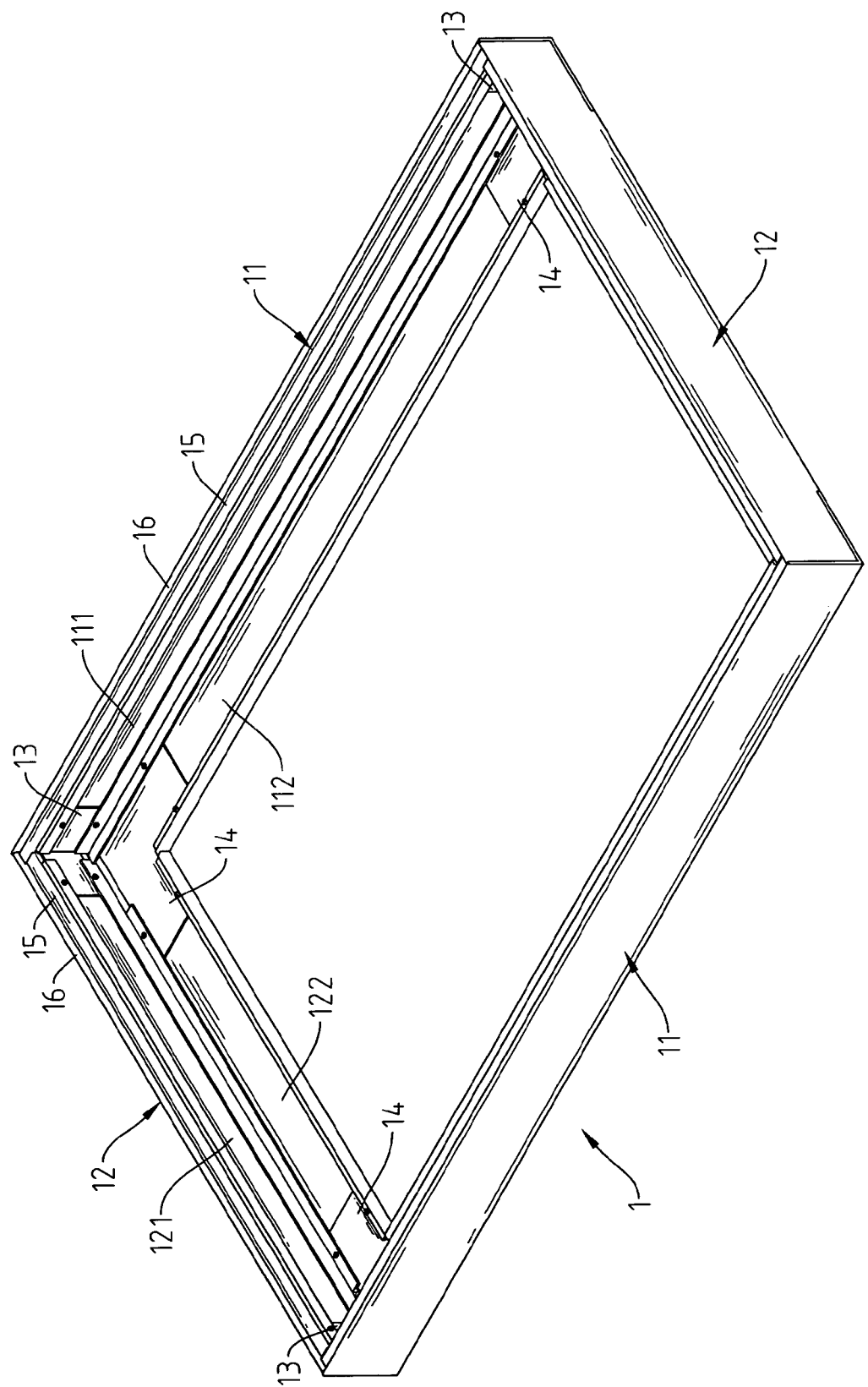
FIG. 7 is a schematic rear view showing the assembled front frame cap of the present invention.

As shown in FIG. 2 and FIG. 3, the front frame cap 1 is composed of two aluminum extrusion long rims 11 and two aluminum extrusion short rims 12, which are connected and matched with one another in pairs. During the molding process, vertical trenches 111, 121 and parallel trenches 112, 122 are formed on the backsides of the vertical surfaces of the aluminum extrusion long rims 11 and the aluminum extrusion short rims 12. As shown in FIG. 4 and FIG. 5, a right-angled plate 13 is inserted into the right-angled abutting portion between the vertical trenches 111, 121, and a plane plate 14 is inserted into the right-angled abutting portion between the parallel trenches 112, 122. Besides, screws are applied to securely fix the right-angled plate 13 and the plane plate 14 to their corresponding trenches, as shown in FIG. 6. As shown in FIG. 7, two long rims 11 and two short rims 12 are mutually assembled to form the front frame cap 1, wherein the right-angled plate 13 is applied to provide the tightness for two connected rims, and the plane plate 14 is applied to provide the flatness for two connected rims so as to form a flat, tight assembled front frame cap 1 and prevent the abutting portions of the front frame cap 1 from the occurrence of unevenness and gaps. As shown in FIG. 7, the recessed surfaces 15, which are surrounded by two ribs 17, are formed on the connection surfaces 16, which are surrounded by the long rims 11 and the short rims 12.

As shown in FIG. 2 and FIG. 9, the back frame cap 2 is composed of two aluminum extrusion long rims 21 and two aluminum extrusion short rims 22, which are connected with one another in pairs by cutting their corresponding ends in 45 degrees to form bevel edges. Besides, plate-receiving trenches 26, which are formed on the abutting surfaces of the rims 21, 22, are constituted by raised slideways 23, 24. The recessed trenches 25 are formed by processing the raised slideways 23 to enable the movable laminas 4 to slide in the recessed trenches 25. Besides, several orientation holes 231 are formed on the raised slideways 23 to penetrate them.

Several screw holes 41 are formed on the movable laminas 4 by vertically pre-drilling the surfaces of the movable laminas 4 in unequal distances. Several screw holes 42 are formed by drilling the movable laminas 4 in positions corresponding to the raised slideways 23. The side frames 9 or the front frames 10 can be securely connected to the screw holes 41. Several connection holes 921, 102 are formed corresponding to the front locking holes 51 and the side locking holes 61 of the LCD panel 5 by processing the side frames 9 and the front frames 10 so as to fixedly assemble the LCD panel 5 to the back frame cap 2 by inserting the screws into them.

The screw holes 41, 42 of the movable laminas 4 and the connection holes 921 of the side frames 9 or the connection holes 102 of the front frames 10 can be pre-drilled to have positions and numbers corresponding with that of the front locking holes 51 or the side locking holes 61 of the LCD panel 5 provided by various manufacturers. In other words, the corresponding positions and numbers of the holes can be adjusted in accordance with the change in specifications and dimensions of the existing LCD panels 5.

Figure 8:
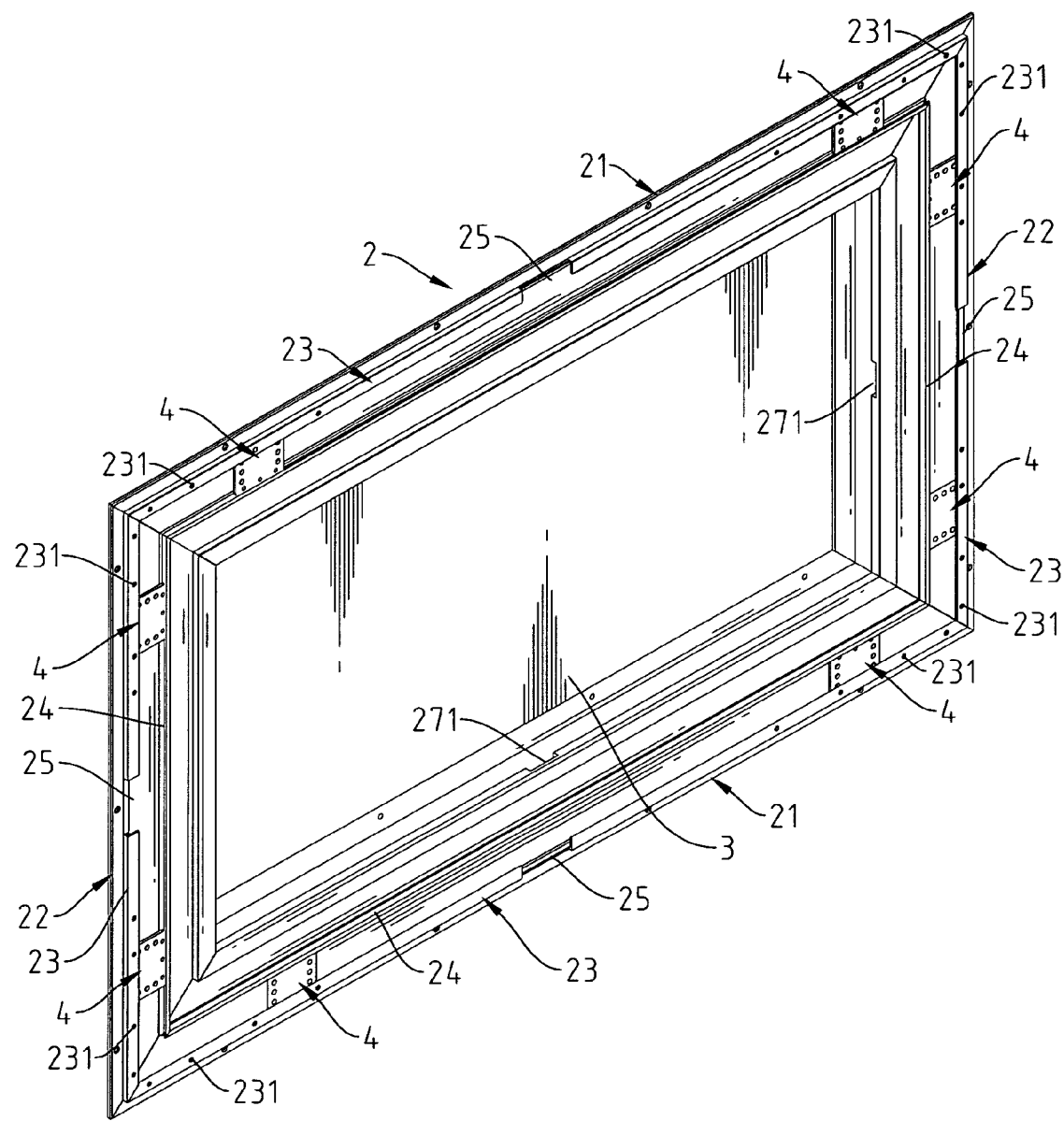
FIG. 8 is a schematic view showing that the movable laminas are assembled to the back frame cap to be mounted on the LCD panel in accordance with the present invention.

Referring to FIG. 8, the numbers and corresponding positions of the exposed screw holes 41 of the movable laminas 4 are shown, wherein the movable laminas 4 are inserted into the plate-receiving trenches 26. The positions of the screw holes 42 are designed to aim at the orientation holes 231 of the raised slideways 23. Accordingly, the screw holes 42 are formed to correspond with the orientation holes 231 such that the screws can be screwed thereon to immovably fix the movable laminas 4 in the plate-receiving trenches 26 of the back frame cap 2.

Several holes can be formed on the raised slideways 23 for fixing the movable laminas 4 such that the movable laminas 4 can be shifted in accordance with the positions of the locking holes of the LCD panel 5. When the movable laminas 4 and the metal side frames 9 or the front frames 10 are shifted to the proper positions, which is suitable for the LCD panel 5, the screws are inserted into the orientation holes 231 and the screw holes 42 to fix the movable laminas 4. When the LCD panel 5 is fixed to the back frame cap 2, the positions of the screw holes of metal side frame 9 and front frame 10 can be changed in accordance with the fixed positions of the holes of the LCD panel 5, as shown in FIG. 9.

Figure 10:
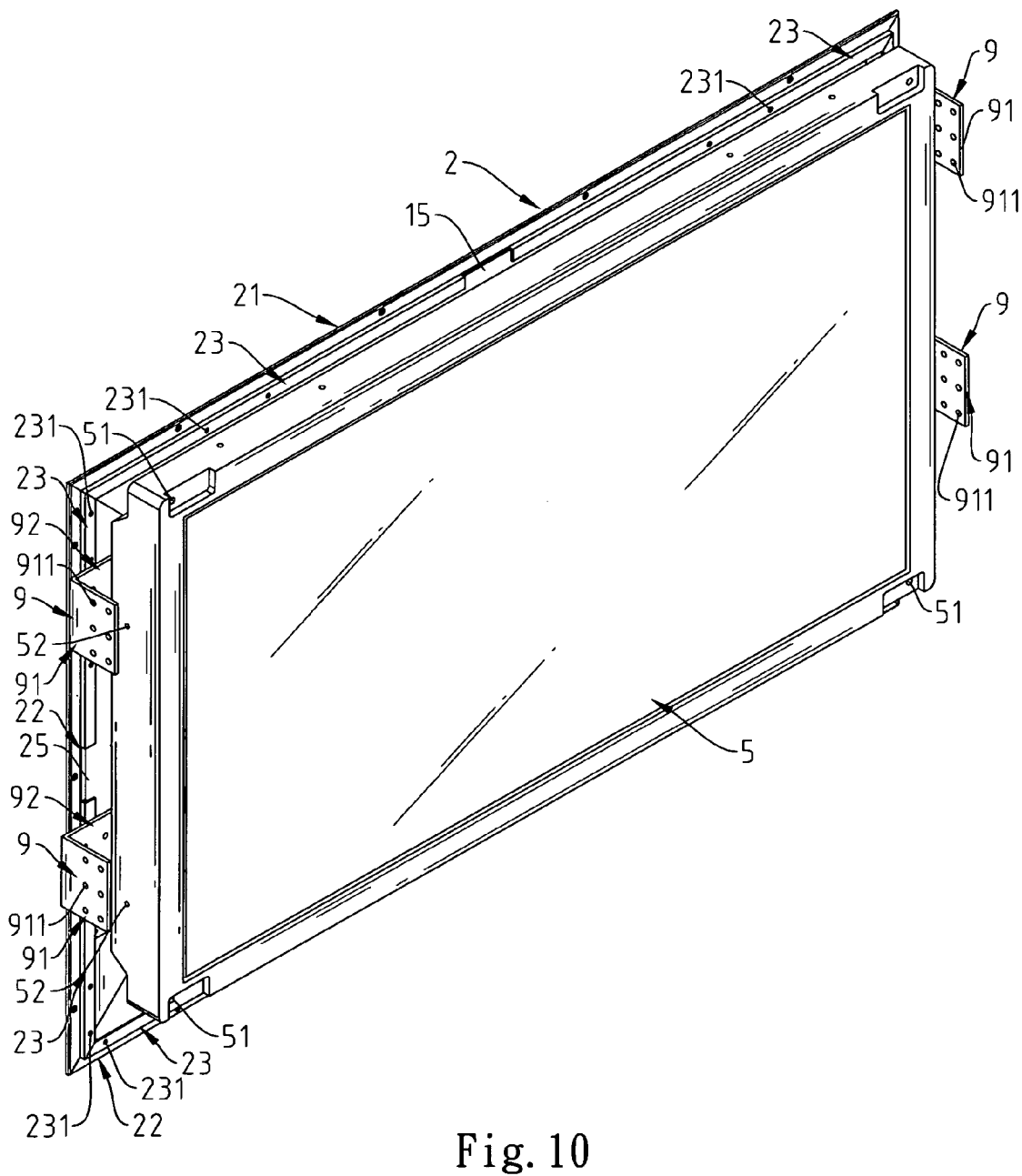
FIG. 10 is a schematic view showing that the LCD panel is assembled to the back frame cap from the lateral side in accordance with the present invention.
Figure 11:
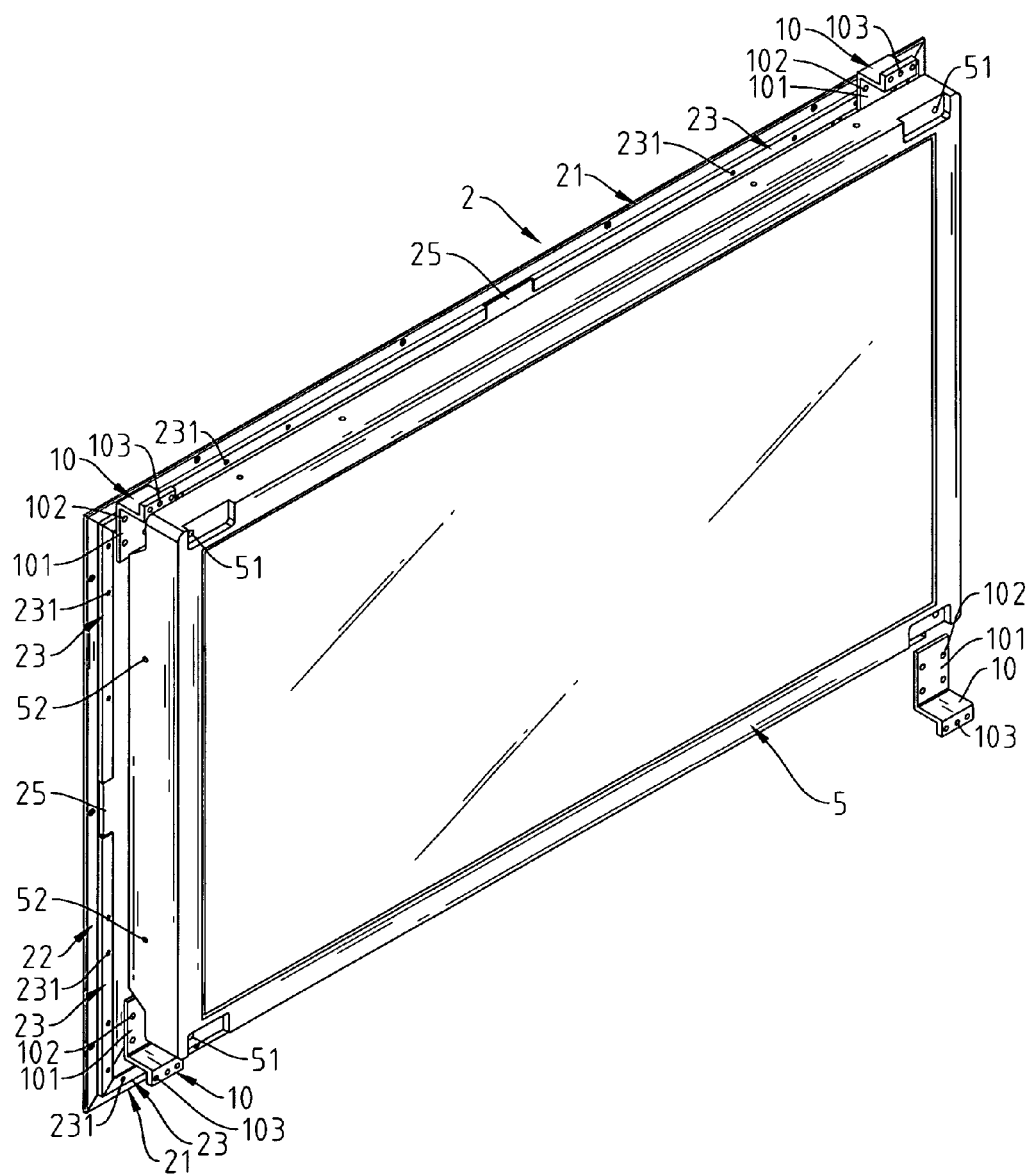
FIG. 11 is a schematic view showing that the LCD panel and the front frame are assembled to the back frame cap in accordance with the present invention.

As shown in FIG. 9 and FIG. 10, if the side fixing holes 52 on the up/down sides or the right/left sides of the LCD panel, but not on its front side, are applied to fix the LCD panel 5, then the right-angled metal side frames 9 are applied to fix the LCD panel 5. Several connection holes 921 are formed on the horizontal surfaces of the side frames 9. Because the fixed holes of the LCD panels, which are manufactured by various manufacturers, are provided with different dimensions and positions, these connection holes 921 are applicable to the fixed holes of these LCD panels. Furthermore, several locking holes 911 are formed on the side connection plate 91 of the side frame 9 corresponding to the screw holes 41 of the movable laminas 4.

In accordance with the above description, it is apparent that each of top, bottom, left, and right plate-receiving trenches 26 comprises the movable laminar 4 and the metal side frame 9 or the front frame 10 to match the front locking holes 51 or the side locking holes 52 of the LCD panel 5. Accordingly, the back frame cap 2 with the standardized specification is suitable to various LCD panels 5, which are manufactured by various manufacturers.

When the back frame cap 2 is assembled to the LCD panel 5, the front surface of the back frame cap 2 is inserted into the front frame cap 1 and fixed thereon so as to achieve the purpose of covering the LCD panel 5. Referring to FIG. 8, the rectangular raised slideways 23 and ribs, which are formed on the abutting surfaces of the back frame cap 2, can be exactly inserted onto the recessed surfaces 15 of the front frame cap 1 such that the electromagnetic wave, which is emitted from the LCD panel 5, is quarantined by the recessed surfaces 15, which are formed on the backside of the front frame cap 1, and the ribs, which are formed on the front side of the back frame cap 2, for reducing radiation influence on their outside to fulfill the need to avoid electromagnetic interference (EMI). Besides, as shown in FIG. 7, the back frame cap 2 can be securely covered by the sheathing 3 by use of the ribs 16 and the recessed surfaces 15, which are formed on the backside of the back frame cap 2, so as to achieve the purpose of entirely covering the LCD panel 5 and the printed circuit board (PCB). Moreover, the electromagnetic waves, which are emitted from the LCD panel 5 and the PCB, are also isolated by this sheathing 3.

Accordingly, the aluminum extrusion front frame cap 1, the aluminum extrusion back frame cap 2, and the aluminum extrusion sheathing 3 of the external framework of the LCD panel can entirely cover the LCD panel 5 and the PCB. The recessed surfaces 15 (shown in FIG. 7), which are formed on the backside of the front frame cap 1, and the ribs, which are formed on the front side of the back frame cap 2, can be applied to isolate the electromagnetic waves. Besides, the external framework, which is made of aluminum material, can be applied to further isolate the electromagnetic waves. In comparison with the existing external framework of the LCD panel, the present invention can lighten the integral weight and avoid the cost of metal partitions.

Figure 12:
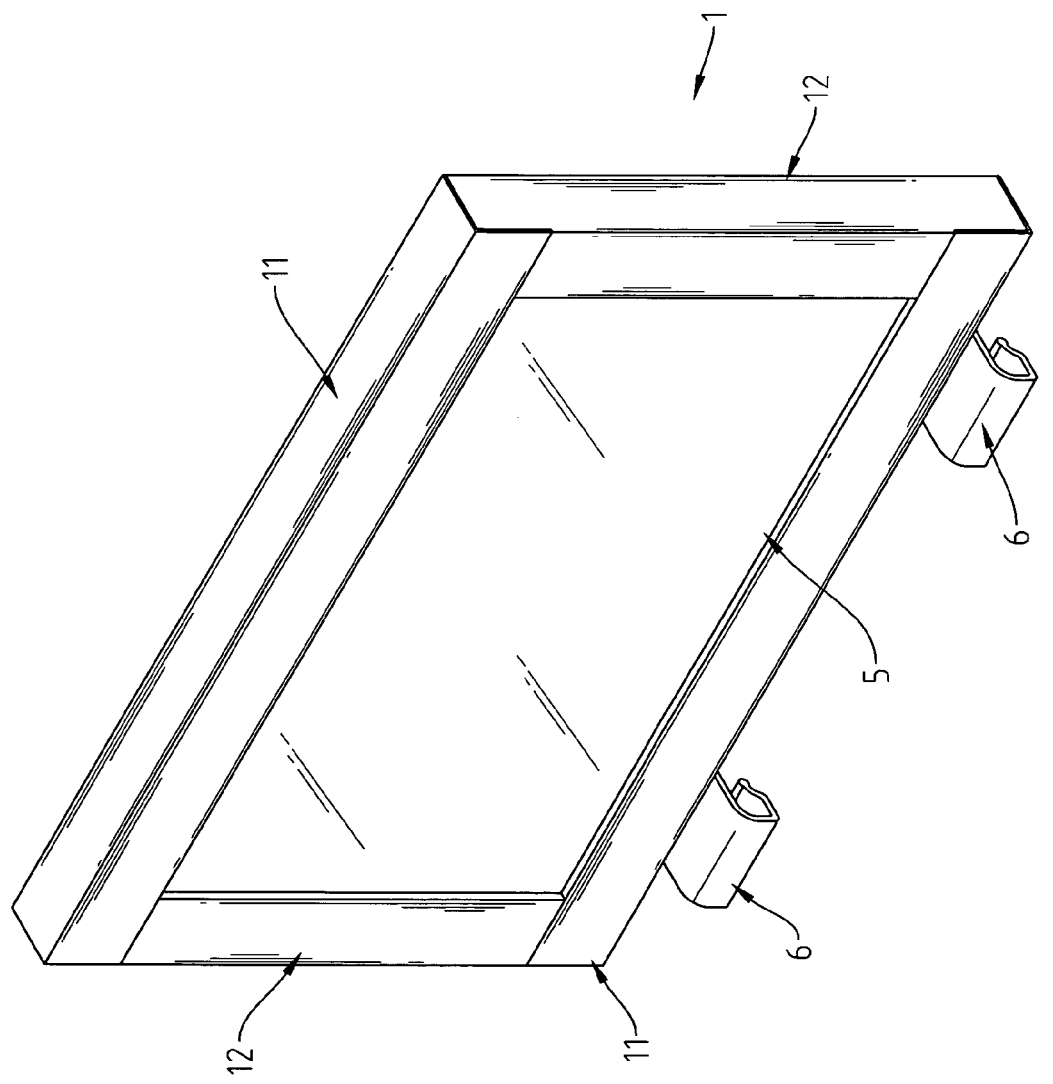
FIG. 12 is a schematic view showing the brackets for use in the external framework of the present invention.

As shown in FIG. 12, for the purpose of mounting, the external framework of the present invention also comprises two brackets 6 on its bottom.

Figure 13:
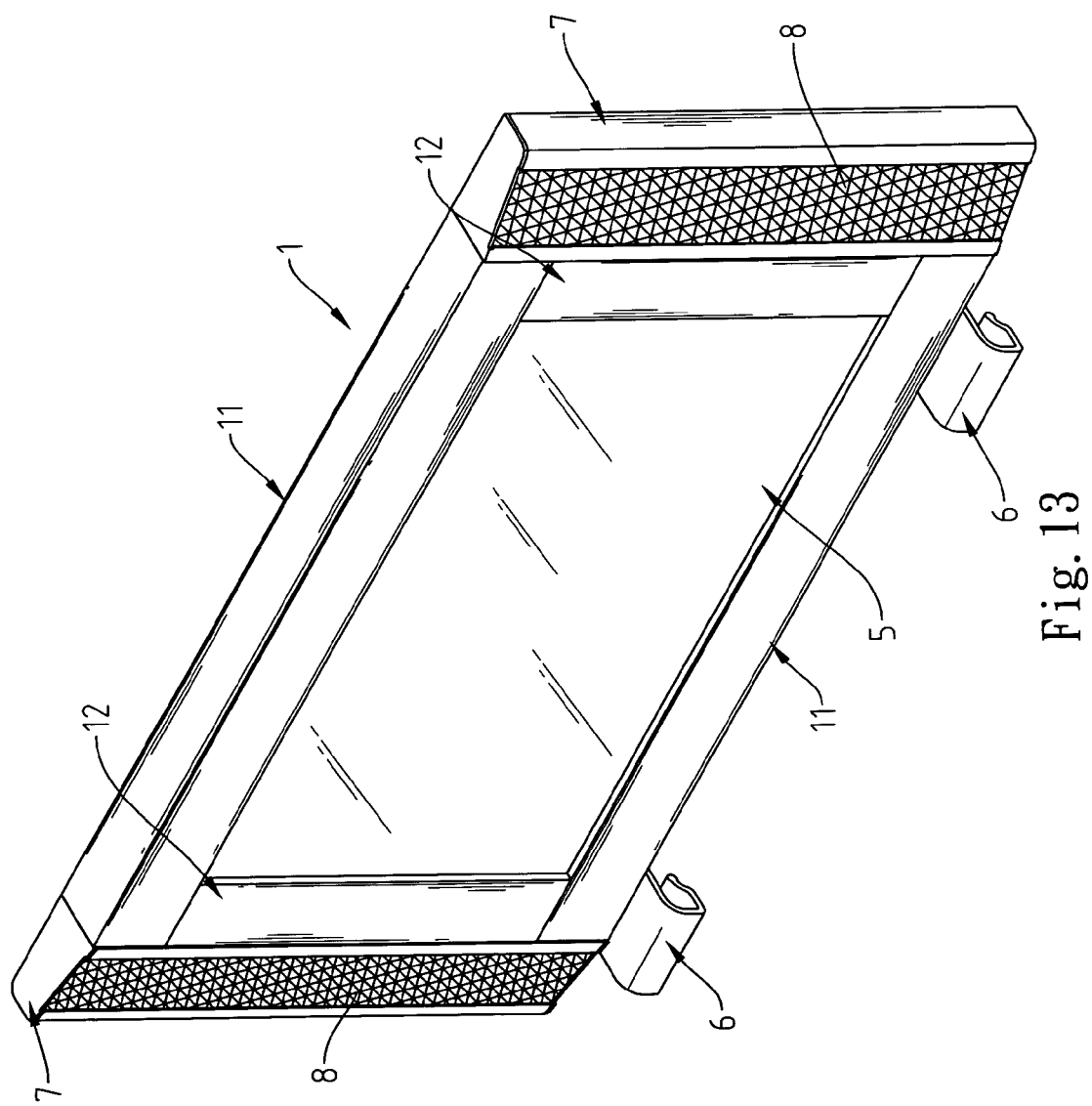
FIG. 13 is a schematic view showing that the speaker frames are mounted on both sides of the external framework in accordance with the present invention.
Figure 14:
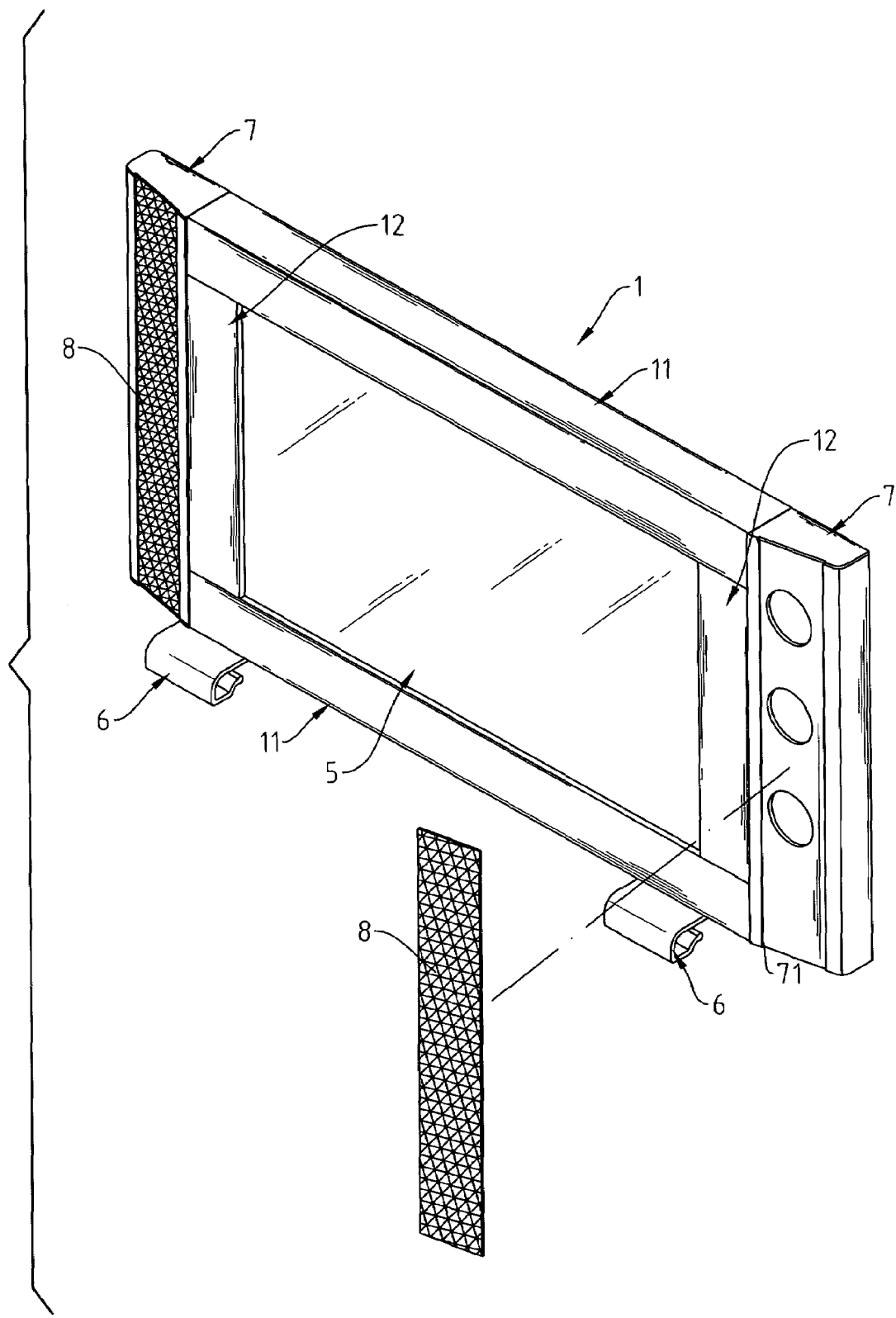
FIG. 14 is a schematic view showing the relationship between the speaker nets and the speaker frames, which are mounted on both sides of the external framework, in accordance with the present invention.
Figure 15:
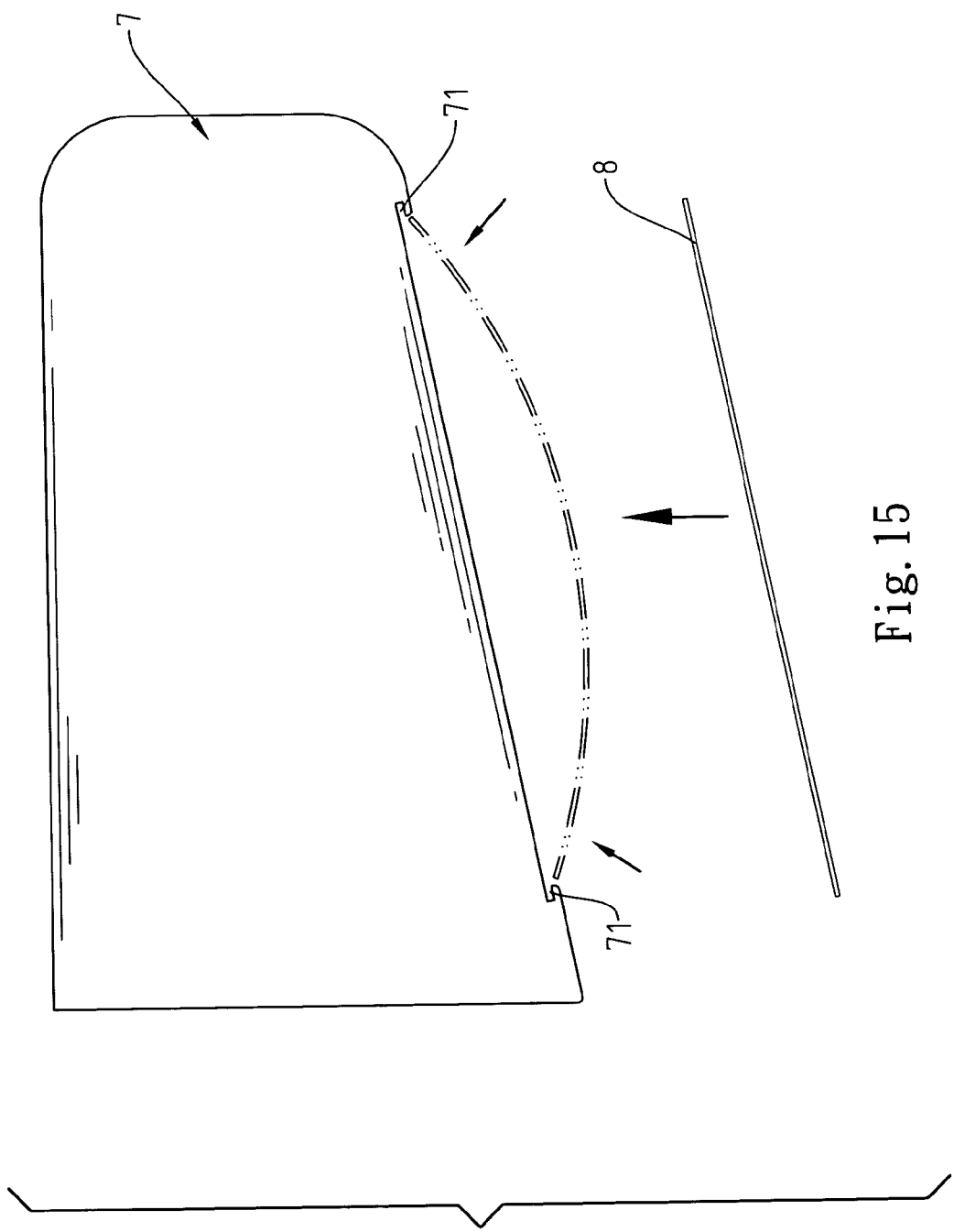
FIG. 15 is a schematic view showing the operation of assembling the speaker nets to the speaker frames in accordance with the present invention.

Moreover, as shown in FIG. 13, the external framework disclosed in the present invention may further comprise a speaker frame 7, which is securely mounted on each side of the external framework. As shown in FIG. 14 and FIG. 15, a recessed trench 71 is formed on the front surface of the speaker frame 7 on which the speaker is mounted and a flexible speaker net 8 is embedded and orientated in this recessed trench 71 by means of the operation shown in FIG. 15 for sealing the speaker, which is mounted on the front surface of the speaker frame 7. Accordingly, the assembled external framework of the present invention can be applied to the LCD monitor and used to construct the more perfect audio-visual apparatus.

Figure 16:
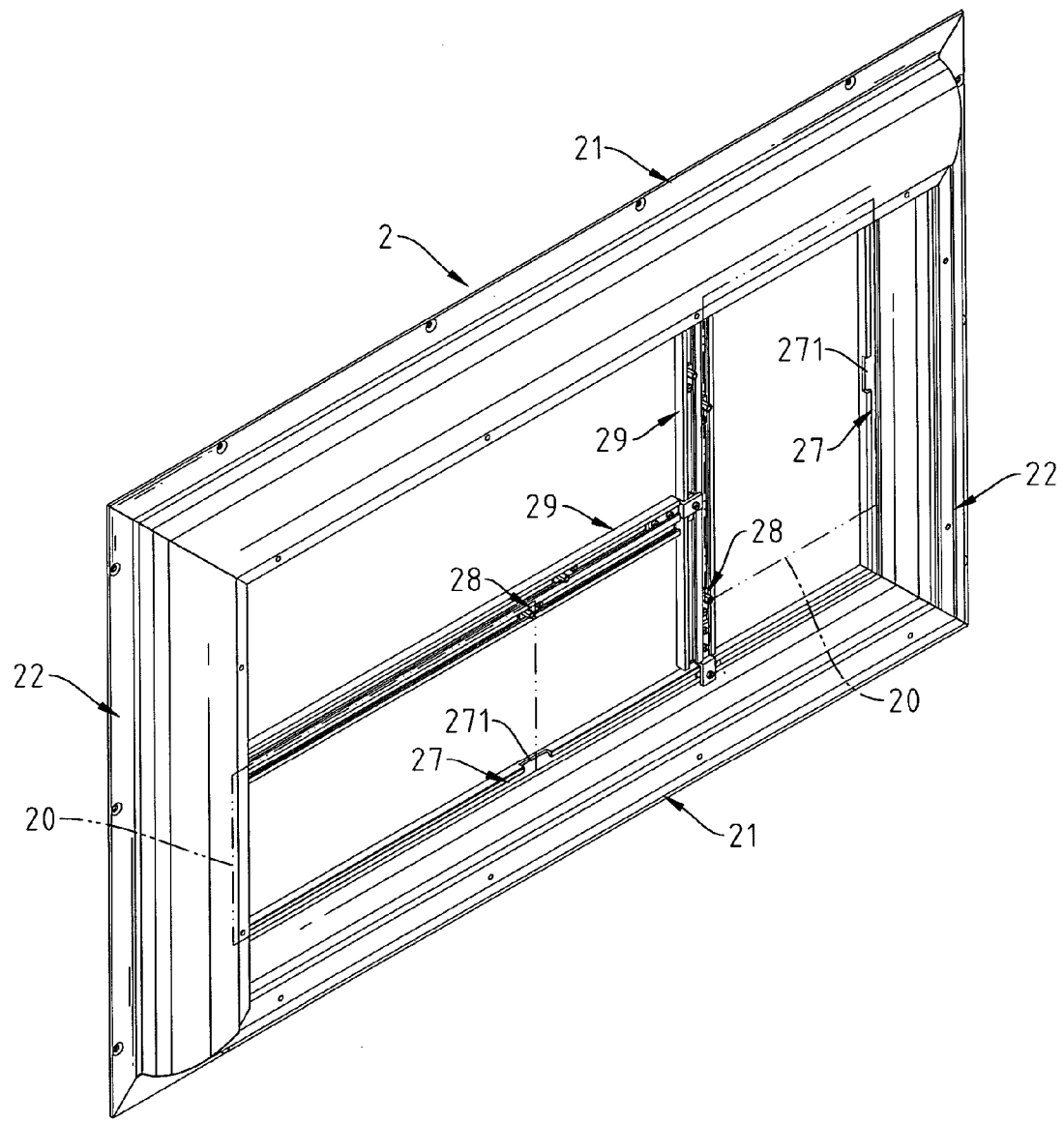
FIG. 16 is a schematic view showing that the PCB is mounted on the backside of the back frame cap in accordance with the present invention.
Figure 17:
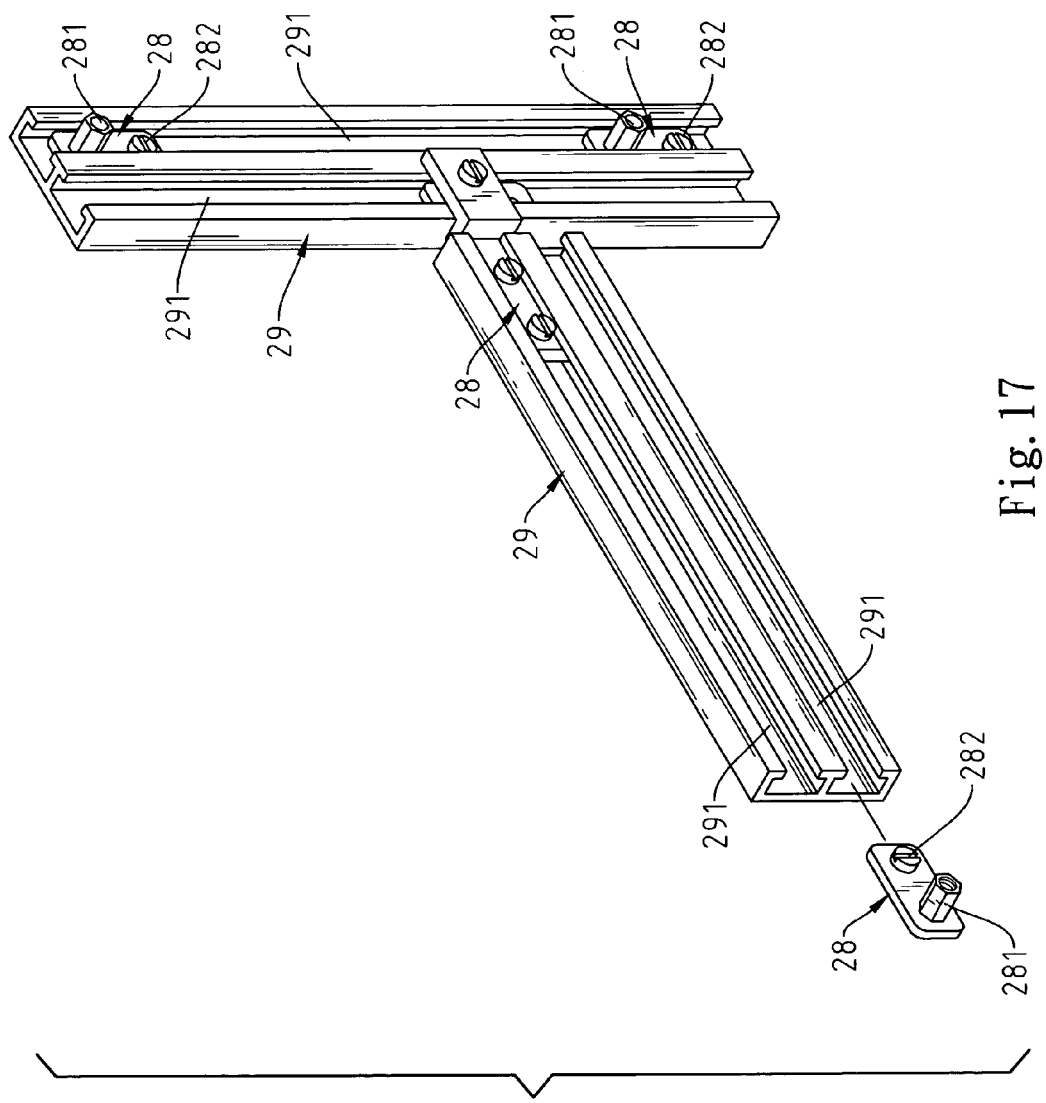
FIG. 17 is an elevational, partial enlarged view showing the assemblage of the X-axial, Y-axial slideways and the movable laminas in accordance with the present invention.

Referring to FIG. 16 and FIG. 17, slideways 27 and movable plates 28 are located in the backside of the back frame cap 2 and mounted on its up, down, left, and right sides. The insertion holes 271 are formed around the slideways 27 so as to insert the movable plates 28 into them. The studs 281 are mounted on the movable plates 28, and the screws 282 are also applied to securely fix the movable plates 28, wherein the PCB 20 is securely mounted on the studs 281. The dimensions of the locking holes of the PCBs 20, which are manufactured by various manufacturers, are different from one another. In order to be suitable for all of the PCBs 20 for locking and fixing the PCB 20 inside the backside of the back frame cap 2, the movable plates 28 and the studs 281 are applied to change the method of fixing the PCB 20. A hollow surface is formed on the center of the backside of back frame cap 2. In order to fix the PCB 20, the X-axial and Y-axial slideways 29 are applied such that the movable plates 28 can be shifted up, down, left, and right in the trenches 291 of the X-axial and Y-axial slideways 29.

What the invention claimed is:

1. A composite structure of an aluminum extrusion external framework of a LCD monitor comprising:
    an aluminum extrusion front frame cap, an aluminum extrusion back frame cap, and an aluminum extrusion sheathing assembled with one another; and
    a plurality of movable laminas having adjustable locking positions on the inside of the back frame cap,
    wherein the front frame cap comprises: two long rims and two short rims connected with one another; vertical trenches and parallel trenches formed on the long and short rims; a right-angled plate securely inserted into each vertical trench; and a plane plate securely inserted into each parallel trench such that the front frame cap is provided with flatness and right-angled form;
    the back frame cap comprises two long rims and two short rims cut in 45 degrees to connect with one another in pairs, each short rim comprising a plate-receiving trench formed on an abutting surface between the short rims, the plate-receiving trench being constituted by two raised slideways to enable the movable laminas to slide within the plate-receiving trenches, a plurality of orientation holes being formed on the inside of the raised slideways; and a plurality of slideways and a plurality of movable plates mounted inside the backside of the back frame cap, a plurality of insertion holes being formed around the slideways for inserting the movable plates into the insertion holes, a plurality of studs being mounted on the movable plates for holding a printed circuit board, a plurality of screws being applied to fix the movable plates; and
    a plurality of first screw holes are vertically formed on surfaces of the movable laminas in unequal distance and a plurality of second screw holes are formed corresponding to the raised slideways, metal side frames and front frames being securely connected to the first screw holes to correspond to a plurality of locking holes of the LCD panel such that a plurality of screws can be inserted into the locking holes to fix the LCD panel to the back frame cap.

2. The composite structure of the aluminum extrusion external framework of the LCD monitor of claim 1, wherein a rectangular recessed surface is surrounded by two ribs and formed on the backside of the front frame cap and the front side and the backside of the back frame cap.

3. The composite structure of the aluminum extrusion external framework of the LCD monitor of claim 1, wherein ribs, which are formed on the abutting surfaces of the back frame cap, are exactly inserted onto the recessed surfaces of the front frame cap to isolate the electromagnetic wave, which is emitted from the LCD panel.

4. The composite structure of the aluminum extrusion external framework of the LCD monitor of claim 1, wherein the first screw holes of the movable laminas and the connection holes of the metal side frames and the front frames are pre-drilled to have positions and numbers corresponding with that of the locking holes of the LCD panel, which is manufactured by various manufacturers.

5. The composite structure of the aluminum extrusion external framework of the LCD monitor of claim 1, wherein a hollow surface is formed on the center of the backside of back frame cap, and X-axial and Y-axial slideways are applied to hold the movable plates in trenches of the X-axial and Y-axial slideways.

* * * * *